US010203240B2

(12) United States Patent
Giro Amigo

(10) Patent No.: US 10,203,240 B2
(45) Date of Patent: Feb. 12, 2019

(54) BUCKET-CARRYING SYSTEM APPLICABLE TO A WEIGHING MACHINE

(71) Applicant: Girnet Internacional, S.L., Badalona (ES)

(72) Inventor: Ezequiel Giro Amigo, Badalona (ES)

(73) Assignee: Girnet Internacional, S.L., Badalona (ES)

( * ) Notice: Subject to any disclaimer, the term of this patent is extended or adjusted under 35 U.S.C. 154(b) by 149 days.

(21) Appl. No.: 15/341,113

(22) Filed: Nov. 2, 2016

(65) Prior Publication Data

US 2017/0122796 A1 May 4, 2017

(30) Foreign Application Priority Data

Nov. 2, 2015 (ES) .................................. 201531570

(51) Int. Cl.
*G01G 21/22* (2006.01)
*G01G 21/02* (2006.01)
*G01G 19/393* (2006.01)

(52) U.S. Cl.
CPC ........... *G01G 21/22* (2013.01); *G01G 19/393* (2013.01); *G01G 21/02* (2013.01)

(58) Field of Classification Search
CPC ....... G01G 21/22; G01G 19/393; G01G 21/02
USPC .......................................................... 177/58
See application file for complete search history.

(56) References Cited

U.S. PATENT DOCUMENTS 4,426,006 A 1/1984 Horii et al.
4,586,613 A * 5/1986 Horii ........................ B07C 5/36 198/370.04
6,448,511 B1 * 9/2002 Dauder Guardiola ...................... G01G 19/393 177/103

FOREIGN PATENT DOCUMENTS

| | | |
|---|---|---|
| EP | 0 803 716 A2 | 10/1997 |
| EP | 0 939 307 A1 | 9/1999 |
| EP | 0 982 570 A2 | 3/2000 |
| FR | 2 842 597 A1 | 1/2004 |

OTHER PUBLICATIONS

Spanish Search Report for ES 201531570 dated May 13, 2016.
Communication dated Feb. 9, 2017 from the European Patent Office in counterpart European application No. 16 38 2503.

* cited by examiner

*Primary Examiner* — Natalie Huls
*Assistant Examiner* — Monica S Young
(74) *Attorney, Agent, or Firm* — Sughrue Mion, PLLC

(57) ABSTRACT

A bucket-carrying system that comprises a bucket, provided with sliding means; a support, that establishes a frame so that the bucket can rest in a stable support position (A) on said support; and connection means that are prepared to connect the bucket to the support mechanically, but in a detachable way, said connection means being articulated to the support to allow a certain vertical gap between the bucket and the support. This allows the bucket to adopt not only the support position (A) on the adapter, but also other positions, of which at least one is a weighing position (B), in which the bucket is slightly raised with respect to the support, and when initiating the forward movement of the support this movement is transmitted by the connection means to the bucket, making it possible for the bucket to slide, while being supported, by its sliding means, for example on a weighing scale; and another position is the coupling position (C) in which the bucket can be separated from the support.

13 Claims, 3 Drawing Sheets

BUCKET-CARRYING SYSTEM APPLICABLE TO A WEIGHING MACHINE

TECHNICAL FIELD OF THE INVENTION

The invention relates to a bucket-carrying system applicable to a weighing machine and a weighing machine that uses the system of the invention.

BACKGROUND OF THE INVENTION

Currently there are known weighing machines with a continuous transport system with bucket-carrying supports along a closed path to which several buckets are coupled. A known type of machines comprise a series of work stations distributed along the path followed by the supports, and by extension the buckets coupled to the supports, such as a loading station where fruit is fed into the buckets; a weighing station where the fruit contained in each bucket is weighed; and an emptying or unloading station where the buckets are emptied.

In the so-called combination weighing machines, several buckets are attached to the same support, and at the emptying station there is a selective emptying of the buckets whose total fruit weight is closest to a predetermined value. A weighing machine of this type is described in patent document EP 0982570.

The weighing operation in the weighing station is carried out without interrupting the forward movement of the supports; in other words, without stopping the transport of the buckets. For this reason, in the literature this type of weighing machine is referred to as a dynamic weighing machine.

To carry out the weighing operation without interrupting the forward movement of each support and bucket set, EP 0982570 suggests that the buckets be articulated to the supports with a certain amount of play, such that the buckets can be lifted with respect to the associated support without becoming mechanically separated, such that the bucket can adopt, with respect to the support, a supporting position, in which the weight of the bucket rests upon the support, as well as a weighing position, in which the bucket is slightly raised with respect to the support. For this, the bucket has slotted holes with grooves through which a bolt associated with the support passes, as well as cut-outs that come in contact with a stop that is integral to the support.

This coupling allows the buckets in the weighing station to circulate by sliding along the weighing platform that is linked to a load cell without ceasing to be transported by the associated support. In the machine according to EP 0982570, the base of the buckets has flaps and a front extension that allow the bucket to support itself on the weighing platform in slide mode.

A first objective of the invention is to provide an alternative to the proposal according to EP 0982570. The proposal according to the patent document EP 0982570 does not allow the bucket to be easily separated from the support, for example to carry out cleaning or maintenance tasks.

Therefore, another object of the invention is a bucket-carrying system with easy assembly and maintenance that does not affect the accuracy of weight measurements.

It is of interest that the solution not require auxiliary components to intervene in the joint between the support and the bucket, which can be lost. In other words, they become free when the joint between the support and the bucket is disconnected.

In the proposal according to EP 0982570, the articulated joint between the support and the bucket is located at a front end of the bucket, such that, in practice, the support pulls the bucket as it is transported, with the forces that pull the bucket acting on a point outside of the usable volume provided by the bucket.

Another object of the invention is a solution that allows this mechanical contact point to be placed at a different location between the support and the associated bucket, without it requiring a change in the configuration of the bucket to prevent interference with elements that must be connected mechanically.

DESCRIPTION OF THE INVENTION

The bucket-carrying system of the invention is applicable to a weighing machine, such as a dynamic weighing machine, and is essentially characterized in that it comprises a bucket, provided with sliding means; a support, that establishes a frame so that the bucket can rest in a stable support position (A) on said support; and connection means that are prepared to link the bucket to the support mechanically, but in a detachable way, said connection means being articulated to the support to allow a certain vertical gap between the bucket and the support when they are mutually connected. This allows the bucket to adopt not only the support position (A) on the adapter, but also other positions, of which at least one is a weighing position (B), in which the bucket is slightly raised with respect to the support, and when initiating the forward movement of the support this movement is transmitted by the connection means to the bucket, making it possible for the bucket to slide, while being supported, by its sliding means, for example, on a weighing scale; and another position is the coupling position (C) in which the bucket can be separated from the support.

In the system of the invention, the bucket is not permanently attached to its support, but mounted on it in a separable way with the intervention of connection means that allow the bucket to nevertheless be moved by the support, even when it is raised above it without supporting its weight on the support.

In one embodiment, the connection means comprise two connection rods, each of which are linked in an articulated way, defining front and rear contact points (x, y), on one side of the bucket and on the support. Thus, the point of application of the forces that are transmitted by the connection means, in the form of connection rods, to the bucket can remain in the area of influence of the weight associated with the bucket.

Thus, in one variant of the invention, the front contact points (x) of the connection rods with the bucket are located in the vicinity of the center of mass of the bucket.

In one variant of the invention, the front and rear contact points (x, y) of each connection rod with the bucket and the support, respectively, correspond one to a fixed articulated junction (y) and a the other to a detachable rotating support (x).

According to one embodiment, the detachable rotating support comprises a fork or hook that attaches or fastens to a connection protrusion.

In one variant, this rotating support connects the connection rods to the bucket. Thus, in one embodiment, the fork or hook is positioned on a front end of the connection rods and the connection protrusion is integral to the bucket, such that the bucket can be detached, or decoupled, from the connection rods without having to undo the mechanical joints, use tools for that purpose, or disassemble components that remain loose with the risk of being lost. In addition, since the detachable rotating support is located between the connection rods and the bucket, the bucket can be separated without taking with it auxiliary components, such as the connection rods which, in this case, will remain attached to the support.

According to one variant of the invention, the opening of the fork or hook is essentially extended towards the fixed articulated junction (y) of the connection rod with the support. Advantageously, this helps prevent the bucket from becoming accidentally detached when it is pushed by the support and subjected to vibrations or bumps, for example, as it transitions to a scale.

Preferably, the fork or hook comprises a receiving section through which the connection protrusion can slide during a coupling operation of the bucket to the connection rods until it reaches a rear wall, such that the connection rod carries out the function of a pusher during the eventual transportation of the support and achieves the forward movement of the bucket.

To prevent the sudden deceleration of movements from leading to the separation of the bucket from the connection rods, in one variant of the invention, the rear wall is part of a retention notch configured to house and snugly retain the connection protrusion of the bucket, such that, like a hub, it allows for the rotating support of this connection protrusion and for the bucket to have a pivoting capacity with respect to the support. All of this prevents the retention protrusions from sliding down the fork when the support decelerates.

In one variant of the invention, the sides of the support frame comprise snap-in recesses, which are intended to receive the support of support protrusions provided in the bucket, these being sufficiently extended beyond the frame in order to be pushed by corresponding external elements capable of moving the bucket from its support position (A) to its weighing position (B).

Preferably, the sliding means are located on the support protrusions and are extended beyond the support frame of the support.

The sliding means can take the form of runners or wheels.

Another aspect of the invention describes a dynamic weighing machine with a transport system that allows the movement of at least one bucket-carrying system according to the invention along a straight horizontal path. This path has a weighing station that comprises a scale upon which the buckets, supported by their corresponding sliding means, can be supported in sliding mode when they adopt their weighing position (B) with respect to the support. In addition, the machine is characterized in that the position of the scale is one in which the front and rear contact points (x, y) in articulated mode of the connection rods to the bucket and the support, respectively, remain horizontally separated when the bucket adopts the mentioned weighing position (B) and slides on the scale.

DETAILED DESCRIPTION OF AN EMBODIMENT

Figure 1:
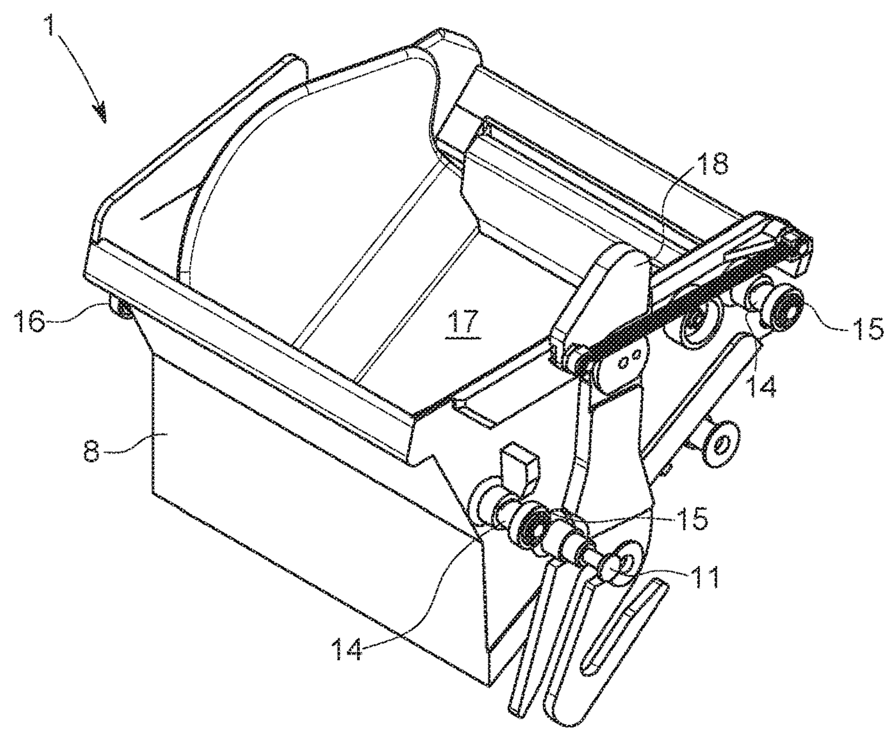
FIG. 1 shows a bucket-carrying system according to one variation of the invention.
Figure 1:
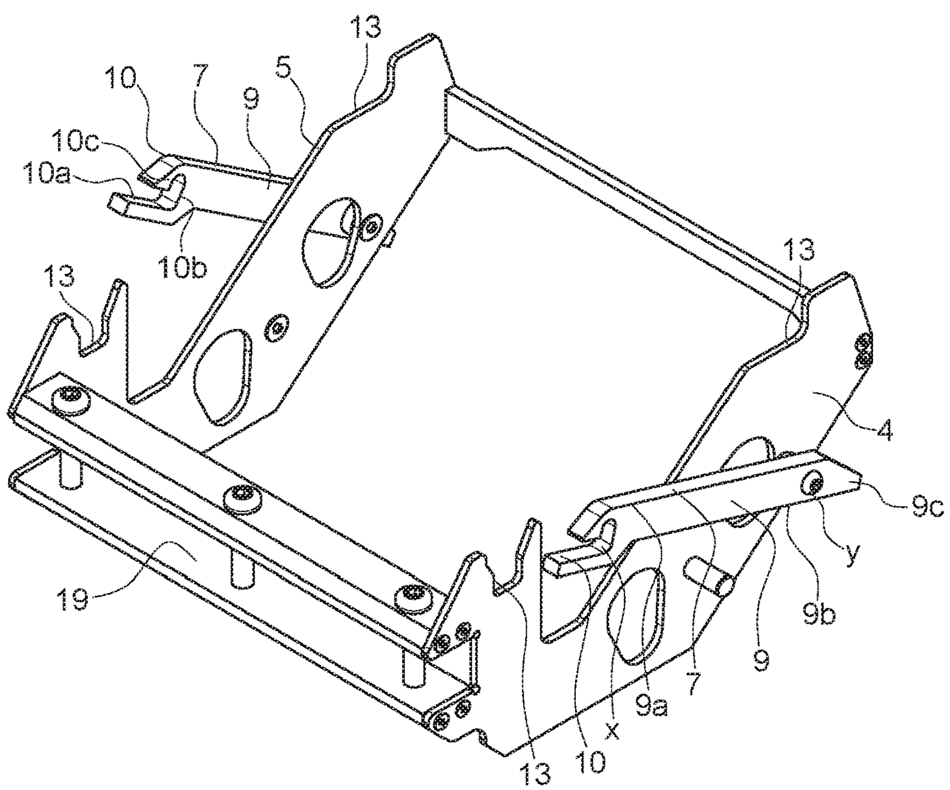

FIG. 1 shows a bucket-carrying system 1 that comprises three main components: a bucket-carrying support 4; a bucket 8; and connection means 7 that allow the separable coupling of the bucket 8 to the support 4 in a unique way as explained in detail below.

In the example of FIG. 1, the support 4 establishes a support frame for the bucket 8. The support 4 is prepared to be attached to a transport bar or transport carriage that will allow its movement along a determined path, for example, in a dynamic weighing machine, carrying with it the support 4 to the bucket 8. Thus, the support 4 has a receiving recess 19 that allows it to be attached, for example by screws, to said transport bar, not shown.

The bucket 8 has the right dimensions to fit into the frame 5 of the support 4. FIG. 1 shows that each of the sides of the frame 5 of the support 4 have two snap-in recesses 13 intended to receive the support of the corresponding support protrusions 14 provided in the bucket 8. In these support protrusions 14 the bucket of the example includes sliding means 15, 16, the purpose of which is explained below. However, we now see that these sliding means 15, 16 are in the shape of wheels and they will be extended beyond the frame 5 when the bucket 8 remains supported on that frame 5.

The connection means 7 are intended to connect the bucket 8 to the support 4 mechanically and in a detachable way such that a forward movement of the support 4 is transmitted by the connection means 7 to the bucket 4 even when the bucket 8 does not support its weight upon the support 4.

In the example of FIG. 1, these connection means 7 comprise two connection rods 9, each of which establish the two articulated contact points to the bucket 8 and the support 4: a front contact point (x) and a rear contact point (y).

In the system 1 of FIG. 1, the rear contact point (y) is an articulated junction that joins the portion 9*b* of the connection rod 9 to a side of the frame 5; while the front contact point x is a detachable rotating support, around which the bucket 8 can pivot when it is weakly coupled to the connection means 7.

Said detachable rotating support comprises a fork 10 formed on the front ends 9*a* of the connection rods 9 and prepared to attach or fasten to the connection protrusions 11 provided for that purpose on each side of the bucket 8.

As shown by FIG. 1, the opening of the fork 10 on each connection rod 9 is essentially extended towards the fixed articulated junction (y) and joins said connection rods 9 to the support 4.

The forks 10 comprise a receiving section 10*a* through which, when the connection means 7 adopt, for example, the coupling position (C) illustrated in FIGS. 1 and 3*a*, the connection protrusions 11 can slide to each side of the bucket 8, during a coupling operation of the bucket 8 to said connection rods 9, until they reach a rear wall 10*b*. This rear wall 10*b* forms part of a retention notch 10*c* expressly configured to house and snugly retain the corresponding connection protrusion 11 of the bucket 8, such that, like a hub, it allows for the rotating support of this connection protrusion 11 and for the bucket 8 to have a pivoting capacity with respect to the support, as shown in FIGS. 2*b* and 2*c*.

Figure 2A:
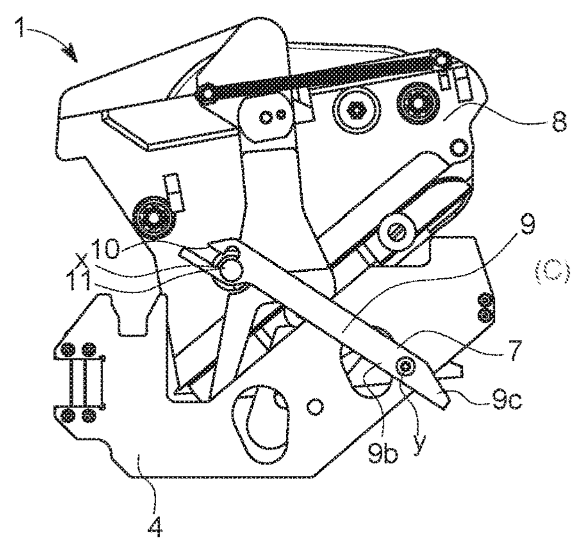
FIGS. 2*a*, 2*b* and 2*c* show the same system as FIG. 1 but adopting different operational positions.
Figure 2B:
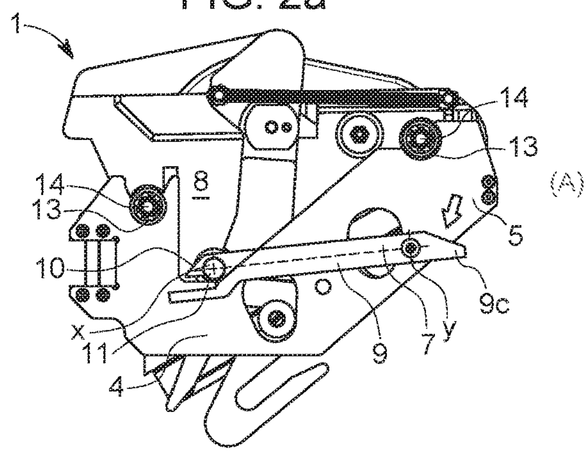
Figure 2C:
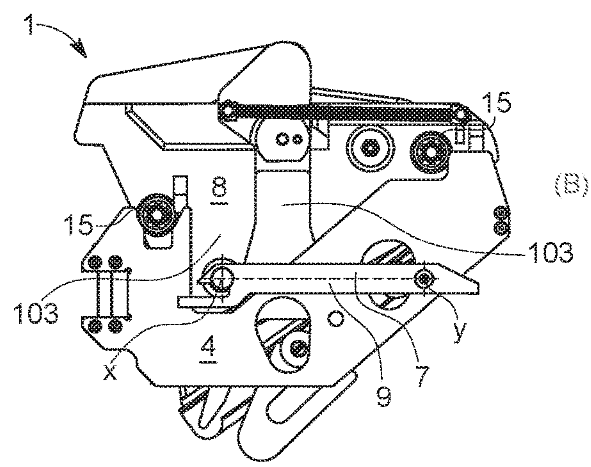

These FIGS. 2*b* and 2*c* specifically show the system in operation. This system 1 is especially suitable for the operation of a machine 100 of the type represented in FIG. 3.

Figure 3:
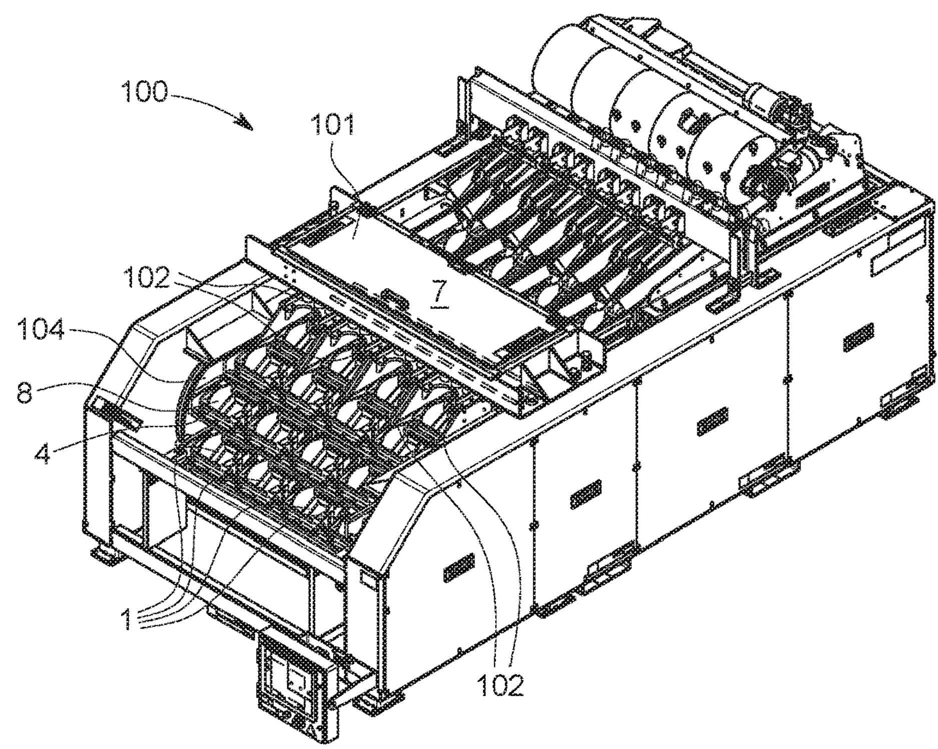
FIG. 3 shows a combination weighing machine.

The weighing machine 100 of FIG. 3 uses the bucket-carrying system 1 according to the invention. Said machine 100 has a transport group 104 that ensures the transport of the supports 4 with their associated buckets 8, organized in rows.

The machine 100 has a loading station for products in the buckets 8 and a weighing station with various scales 102 (see FIG. 4) through which the supports 4 pass, carrying with them the buckets 8 loaded with the product.

FIG. 2*b* shows the bucket-carrying system 1 of the invention when the connection means 7 adopt a support position (A) in which the bucket 8 supports itself on the support 4. In this position, each one of the support protrusions 14 of the bucket 8 fit into a snap-in recess 13 of the frame 5 of the support 4 and the weight of the bucket rests upon its support 4. This is the position that the buckets 8 adopt by default with respect to the supports 4 while they are transported on the machine 100.

Figure 4:
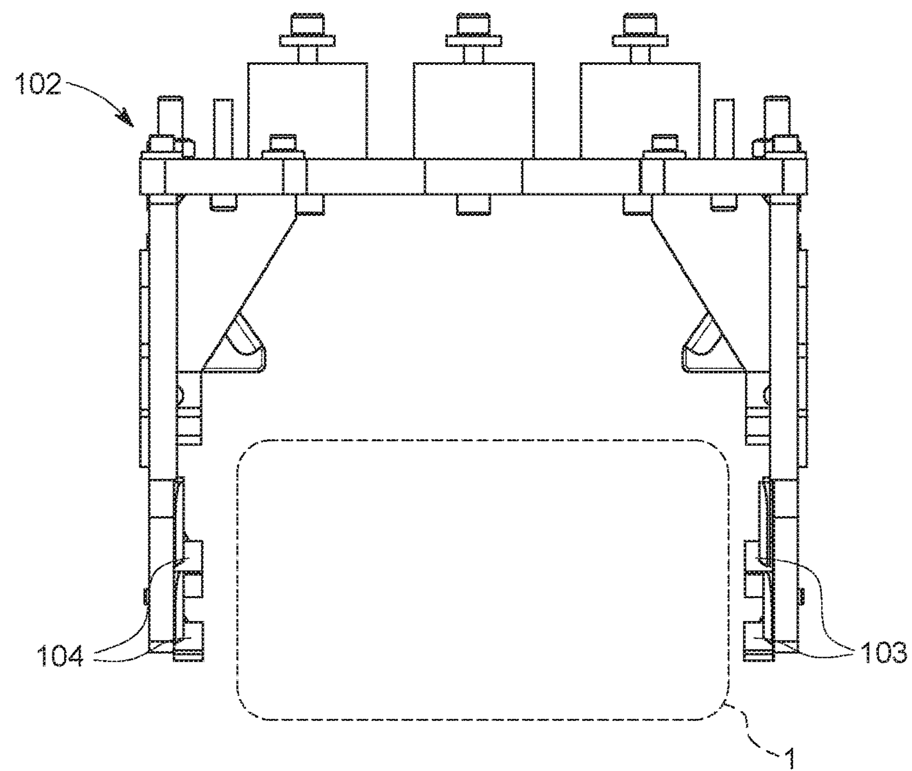
FIG. 4 shows a weighing station of the machine of FIG. 3, especially suitable for its use with the bucket-carrying system of FIG. 1.

FIG. 2*c* shows what happens in the bucket-carrying system 1 when the supports 4 reach a scale 102 like the one represented in FIG. 4. At this point of the machine 100, the system 1 allows the connection means 7 to adopt the weighing position (B) in which the bucket 8 is slightly raised with respect to the support 4, making it possible for the bucket 8 to support itself in slide mode on the weighing scale 102. In the example, the weighing scale is provided with two rail sets 103 and 104 upon which the sliding means 15 and 16, respectively, can roll. These rail sets are located on each side of the bucket 8, with the weight of the bucket 8 resting on the scale 102 while it rolls, supported on the rail sets 103 and 104 of the scale 102. While this takes place, the connection rods 9 of the connection means 7 carry out the function of a pusher and achieve the forward movement of the bucket 8, even if the bucket is raised with respect to the support 4.

It is noted that the relative position between the scale 102 and the system 1 is such that the front and rear connection points (x, y) in articulated mode of the connection rods 9 with the bucket 8 and the support 4, respectively, remain horizontally separated precisely when the bucket 8 adopts the mentioned weighing position (B) shown in FIG. 2*c* and slides on the scale 102. Advantageously, the appearance of push or reaction forces with vertical components that could alter weight measurement is avoided. In said FIG. 2*c*, the rails of the rail set 103 of the scale 102, upon which the sliding means 15 of the bucket 8 roll, are shown schematically.

FIGS. 2*b* and 2*c* also show that the front contact points (x) of the connection rods (9) to the bucket 8 are located in the vicinity of the center of mass of the bucket 8, which also helps prevent unfavorable occurrences when obtaining accurate weight measurements.

According to another notable aspect of the system 1 of the example, the connection rods 9 comprise an extension 9*c* that goes beyond the rear contact point (y) of the connection rods 9 to the support 4, which is beyond the articulated joint of the section 9*b* of the connection rod 9 to the support 4. This extension 9*c*, coming from the coupling position (A) shown in FIG. 2*b*, allows for the removal of the output protrusions 11 of the bucket 8 from the retention notches 10*c* of the forks 10 during the first extraction or separation phase of the bucket 8. To implement this first extraction phase, the invention envisages equipping the machine 100 or the system 1 with motorized pushers capable of pressing down on the extensions 9*c* of the connection rods, as indicated by the arrow in FIG. 2*b*, in order to make it turn around the rear contact point (y).

In a second extraction phase, the bucket 8 can be pulled slightly forward and upward manually to prevent interference with the frame 5 of the support 4 until the connection protrusions 11 of the forks 10 are completely removed and the bucket 8 can then be easily separated from the support 5, when necessary, for example for maintenance operations.

This specific connection between the bucket 8 and the support 4 in the system 1 of the invention does not hinder unloading the contained products when required, for example, in the weighing machine 100. To unload products, unlike the known solutions based on pivoting the support 4 with respect to its transport bar to overturn the content of the bucket, in the system 1, buckets 8 are used with a lower collapsible lid 17 that is activated by a rotating operating lever 18 connected to one side of the bucket 8. The products can therefore be unloaded while the bucket 8 adopts its coupling position (A) on the associated support 4.

The invention claimed is:

1. A bucket-carrying system applicable to a weighing machine, such as a dynamic weighing machine, comprising:
   - a bucket provided with sliding means,
   - a support that establishes a frame so that the bucket can rest in a stable support position on said support, and
   - connection means configured to mechanically link the bucket to the support, the connection means comprise two connection rods, each defining front and rear contact points on one side of the bucket and the support, respectively, one of the front and rear contact points corresponds to a first coupling between the connection rod and the support that permits relative movement between the connection rod and the support and the other of the front and rear contact points corresponds to a second detachable coupling that detachably links the bucket to the support, and wherein turning the connections rods with respect to the support positions the bucket in multiple positions relative to the support, including:
     - a support position in which the bucket is supported on the support;
     - a weighing position in which a vertical gap exists between the bucket and the support so that the bucket is pivoted upwards by the two connection rods to a slightly raised position with respect to the support compared to the support position, and when initiating forward movement of the support the forward movement is transmitted by the connection means to the bucket, enabling the bucket to slide or roll, while being supported, by the sliding means; and
     - a coupling position in which the bucket is further pivoted upwards allowing the second detachable coupling to be positioned so that the bucket is separable from the support.

2. The system according to claim 1, wherein the front contact points of the connection rods with the bucket are located in the vicinity of the center of mass of the bucket.

3. The system according to claim 1, wherein the second detachable coupling comprises a fork or hook configured to received and attach or fasten to a connection protrusion of the bucket.

4. The system according to claim 3, wherein the fork or hook is positioned on a front end of the connection rods and wherein the connection protrusion is integral to the bucket, such that the bucket can be detached, or decoupled, from the connection rods.

5. The system according to claim 4, wherein the opening of the fork or hook is extended towards the fixed articulated junction of the connection rod with the support.

6. The system according to claim 5, wherein the fork or hook comprises a receiving section through which the connection protrusion can slide during a coupling operation of the bucket to the connection rods until the connection protrusion reaches a rear wall, such that the connection rod carries out the function of a pusher during the eventual transportation of the support and procures the forward movement of the bucket.

7. The system according to claim 6, wherein the rear wall is located in retention notch configured to house and snugly retain the connection protrusion of the bucket, such that, like a hub, it allows for the rotating support of this connection protrusion and or the bucket to have a pivoting capacity with respect to the support.

8. The system according to claim 1, wherein the sides of the frame of the support comprise snap in recesses, which are configured to receive support protrusions attached to the bucket, the support protrusions extended beyond the frame in order to engage be corresponding external elements configured to move the bucket from the support position to the weighing position.

9. The system according to claim 8, wherein the sliding means are on the support protrusions.

10. The system according to claim 1, wherein the sliding means take the form of runners or wheels.

11. A weighing machine with a transport system that allows the movement of at least one bucket-carrying system according to claim 1 along a straight horizontal path, which has a weighing station that comprises a scale upon which the buckets, supported by their corresponding sliding means, can be supported in sliding mode when they adopt their weighing position with respect to the support, wherein the position of the scale is one in which the front and rear contact points in articulated mode of the connection rods to the bucket and the support, respectively, remain horizontally precisely when the bucket adopts the mentioned weighing position and slides or rolls on the scale.

12. The system according to claim 1, wherein in the weighing position, when initiating the forward movement of the support, the forward movement is transmitted by the connection means to the bucket, enabling the bucket to slide or roll, while being supported, by the sliding means on a weighing scale.

13. A bucket-carrying system for use in a weighing machine, comprising:

- a bucket comprising rollers;
- a support frame configured to receive and support the bucket;
- a lever pivotally coupled to the support frame at a first coupling and detachably coupled to the bucket at a second coupling, the second coupling in the form of a hook or fork at one end of the lever in which a corresponding first member protruding from the bucket is received;
- wherein the lever positions the bucket in multiple positions relative to the support frame, depending on an angular position of the lever about the first coupling, the multiple positions including:
  - a support position in which the bucket is supported on the support frame;
  - a weighing position in which the bucket is raised relative to the support position, and wherein a forward movement of the support frame transmits, via the lever, forward movement to the bucket on the rollers; and
  - a coupling position in which the second coupling is positioned so that the bucket is lifted from the support frame.

* * * * *